(12) United States Patent
Inaba et al.

(10) Patent No.: US 10,404,327 B2
(45) Date of Patent: Sep. 3, 2019

(54) ROBOT CONTROL SYSTEM PROVIDED WITH FUNCTIONS OF EMITTING WARNINGS AND STOPPING MACHINE BASED ON DISTANCE OF MACHINE FROM PORTABLE WIRELESS OPERATION PANEL

(71) Applicant: FANUC CORPORATION, Yamanashi (JP)

(72) Inventors: Ryoutarou Inaba, Yamanashi (JP); Yoshiki Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 431 days.

(21) Appl. No.: 15/067,165

(22) Filed: Mar. 10, 2016

(65) Prior Publication Data

US 2016/0271793 A1 Sep. 22, 2016

(30) Foreign Application Priority Data

Mar. 17, 2015 (JP) .................. 2015-053950

(51) Int. Cl.
  *B25J 9/16* (2006.01)
  *H04B 5/00* (2006.01)
  *H04W 4/02* (2018.01)

(52) U.S. Cl.
  CPC .......... *H04B 5/0062* (2013.01); *B25J 9/1676* (2013.01); *H04W 4/023* (2013.01); *G05B 2219/39082* (2013.01); *G05B 2219/39097* (2013.01)

(58) Field of Classification Search
  CPC ...... B25J 9/1689; B25J 9/1666; B25J 9/1676; H04B 5/0062

USPC ................................ 700/245–264
See application file for complete search history.

(56) References Cited

U.S. PATENT DOCUMENTS

| | | | | |
|---|---|---|---|---|
| 7,974,736 B2* | 7/2011 | Morin | ............. | F41A 23/34 318/568.24 |
| 9,201,422 B2* | 12/2015 | Ohtomo | ............. | G08G 5/0069 |
| 9,318,014 B1* | 4/2016 | Cheatham, III | ....... | B64D 47/08 |
| 9,902,060 B2* | 2/2018 | Inaba | ............. | H04W 76/25 |
| 2009/0030550 A1* | 1/2009 | Nagata | ............. | B25J 19/06 700/251 |
| 2011/0264266 A1* | 10/2011 | Kock | ............. | B25J 9/1676 700/253 |
| 2015/0217455 A1* | 8/2015 | Kikkeri | ............. | B25J 9/1676 700/259 |

(Continued)

FOREIGN PATENT DOCUMENTS

| JP | 7-20284 U | 4/1995 |
|---|---|---|
| JP | 2001-142531 A | 5/2001 |
| JP | 2007-233817 A | 9/2007 |

(Continued)

*Primary Examiner* — Timothy R Waggoner
(74) *Attorney, Agent, or Firm* — Hauptman Ham, LLP (57) ABSTRACT

The robot control system includes: a control device for controlling a machine; a portable wireless operation panel for performing wireless communication with the control device to control the machine; a distance measuring unit for measuring the distance between the machine and the portable wireless operation panel; and a warning generator that emits a warning to the operator or stops the machine when the distance between the machine and the portable wireless operation panel exceeds a predetermined threshold value.

2 Claims, 12 Drawing Sheets

(56) References Cited

U.S. PATENT DOCUMENTS

2017/0210006 A1* 7/2017 Takahashi .............. B25J 9/1612

FOREIGN PATENT DOCUMENTS

| JP | 2008-220553 A | 9/2008 |
| JP | 5492438 B2 | 5/2014 |
| JP | 2014-152458 A | 8/2014 |
| WO | 2006/103838 A1 | 10/2006 |

* cited by examiner

ROBOT CONTROL SYSTEM PROVIDED WITH FUNCTIONS OF EMITTING WARNINGS AND STOPPING MACHINE BASED ON DISTANCE OF MACHINE FROM PORTABLE WIRELESS OPERATION PANEL

RELATED APPLICATIONS

The present application claims priority to Japanese Patent Application Number 2015-053950, filed Mar. 17, 2015, the disclosure of which is hereby incorporated by reference herein in its entirety.

BACKGROUND OF THE INVENTION

1. Field of the Invention

The present invention relates to a robot control system, in particular, relating to a robot control system having a function of emitting warnings and stopping the operation of a machine based on the distance of the machine from a portable wireless operation panel.

2. Description of the Related Art

Portable operation panels for giving instructions and the like to a robot are required to satisfy the standard (ISO 10218-1) that the operation panel can output signals to perform an emergency stop of the robot so as to be able to promptly stop the robot in an emergency. When the portable operation panel is used based on wireless communication, there is a risk that the robot cannot be stopped promptly if the quality of the wireless communication is low, and hence is hazardous. For this reason, it has been a practice that the robot is stopped when the quality of wireless communication becomes lower than a certain level to thereby ensure safety.

However, even if the quality of communication is good, if the operator moves away from the robot, the robot can be controlled from a place where the operator cannot check, which is hazardous.

As a conventional robot control system, there has been a known system which ensures safety by recognizing the position of the operator (e.g., Japanese Patent No. 5492438). However, this is not a system that can recognize the distance of the robot from a mobile body referred to as a portable wireless operation panel.

As a wireless teaching device, there has been a known automated machine system which, by exchanging live signals by wireless communication at predetermined intervals and monitoring the time interval of reception so as to detect the wireless communication state, gives warnings to the operator and/or stops the automated machine when the wireless communication state becomes poor (Japanese Unexamined Patent Publication (Kokai) No. 2007-233817). This conventional art is based on the technology that the reception interval between live signals will become longer due to degradation of the communication state of the wireless communication when the distance between the receivers becomes far. However, this technology does not take any consideration of possible variations of the quality of communication, i.e., some places have a good quality of communication and other places with poor quality due to environmental factors.

Figure 1:
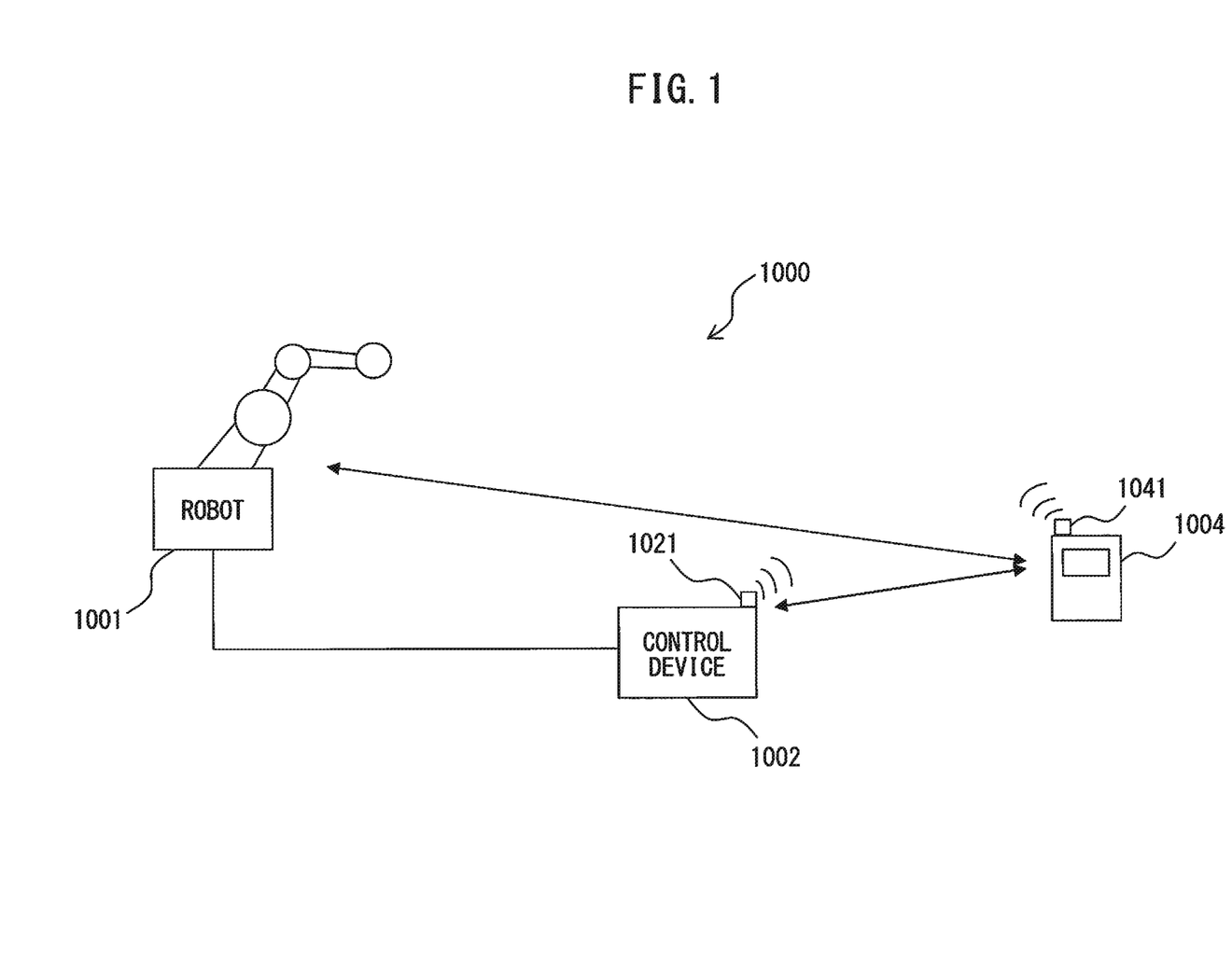
FIG. 1 is a configurational diagram showing a conventional automated machine system.

There is another known automated machine system which, by monitoring the intensity of radio waves between the controller and the teaching device, gives warnings and/or stops the automated machine when the intensity of radio waves becomes equal to or lower than a predetermined threshold (for example, International Publication 2006/103838). FIG. 1 shows a configuration of a conventional automated machine system. A conventional automated machine system 1000 is adapted to stop a robot 1001 when the quality of communication between a transceiver 1021 of a control device 1002 for controlling the robot 1001 and a transceiver 1041 of a teaching device 1004 degrades, to thereby ensure safety. However, the teaching device 1004 can control the robot 1001 even if they are located distant from each other as long as the quality of communication is good. As a result, if the operator erroneously operates the teaching device 1004 when the teaching device is located far away from the robot 1001, the robot may move without knowledge of the operator, causing safety problems. There are many robot systems of which the robot 1001 and the transceiver 1021 of the control device 1002 are located far away from each other. A situation in which the transceiver 1021 of the control device 1002 and the transceiver 1041 of the teaching device 1004 are located close to each other and hence communication quality is good even if there is a great distance between the teaching device 1004 and the robot 1001 can be easily imagined.

SUMMARY OF THE INVENTION

In order to solve the above problem it is therefore an object of the present invention to provide a robot control system that can improve safety by measuring the distance between a robot and a portable wireless operation panel, warning the operator when the distance becomes far and stopping the robot when the distance becomes even further.

A robot control system according to one aspect of the present invention includes: a control device for controlling a machine; a portable wireless operation panel that can perform wireless communication with the control device to control the machine; a distance measuring unit for measuring the distance between the machine and the portable wireless operation panel; and, a warning generator that emits a warning to the operator or stops the machine when the distance between the machine and the portable wireless operation panel exceeds a predetermined threshold value.

BRIEF DESCRIPTION OF THE DRAWINGS

The object, features and advantages of the present invention will be better understood by reading the following description of the embodiments, taken together with the drawings wherein.

DETAILED DESCRIPTION OF THE INVENTION

Referring now to the drawings, robot control systems according to the present invention will be described.

First Embodiment

Figure 2:
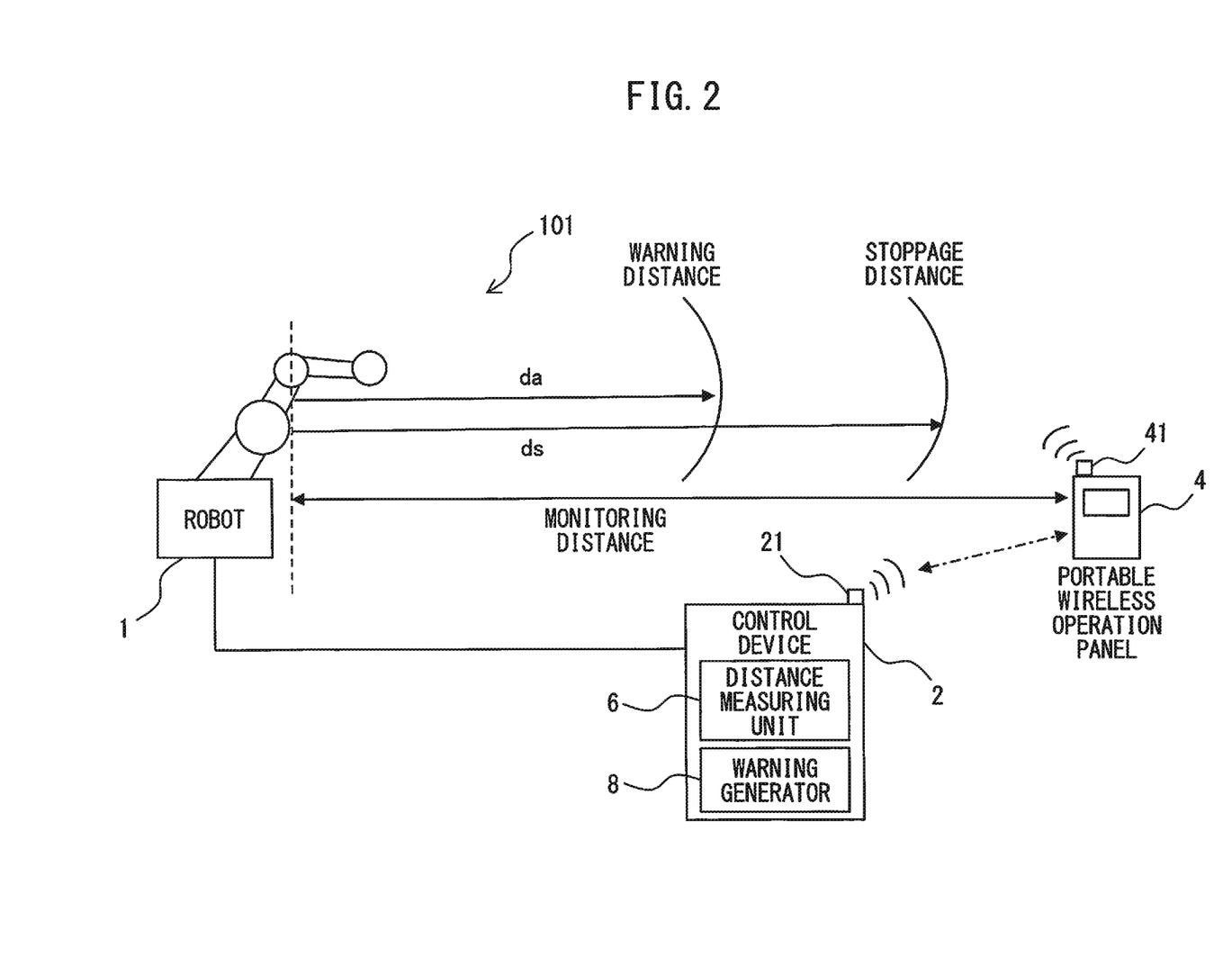
FIG. 2 is a configurational diagram showing a robot control system according to a first embodiment of the present invention.

A robot control system according to a first embodiment of the present invention will be described. FIG. 2 is a configurational diagram showing a robot control system according to the first embodiment of the present invention. The robot control system 101, according to the first embodiment of the present invention includes a control device 2 for controlling a machine, i.e., a robot 1; a portable wireless operation panel 4 that can wirelessly communicate with the control device 2 to control the robot 1; a distance measuring unit 6 for measuring the distance between the robot 1 and the portable wireless operation panel 4; and a warning generator 8 for emitting a warning to the operator or stopping the robot 1 when the distance between the robot 1 and the portable wireless operation panel 4 exceeds a predetermined threshold. Though the distance measuring unit 6 is provided in the control device 2 in FIG. 2, the distance measuring device 6 may be provided in the portable wireless operation panel 4 or may be provided in both the control device 2 and the portable wireless operation panel 4.

As shown in FIG. 2, the portable wireless operation panel 4 has a transceiver 41 to transmit commands for controlling the robot 1 wirelessly to a transceiver 21 on the control device side provided for the control device 2. The control device 2 controls the robot 1 based on the received commands.

Since the portable wireless operation panel 4 can control the robot 1 wirelessly, the portable wireless operation panel 4 can perform remote control of the robot 1 from a position away from the robot and the control device 2. However, if the portable wireless operation panel 4 moves too far away from the robot 1, there occur cases where the robot 1 cannot be viewed from the point of the portable wireless operation panel 4, causing safety risks. To deal with this, in the present invention the distance between the robot 1 and the portable wireless operation panel 4 is monitored so as to emit a warning to the operator or stop the robot 1 when the distance between the robot 1 and the portable wireless operation panel 4 exceeds a predetermined threshold.

Specifically, the distance measuring unit 6 provided in the control device 2 measures the distance between the robot 1 and the portable wireless operation panel 4. When the distance between the robot 1 and the portable wireless operation panel 4 exceeds a warning distance da, the warning generator 8 generates a warning. Further, when the portable wireless operation panel 4 moves away from the robot 1 and the distance between the robot 1 and the portable wireless operation panel 4 exceeds a stoppage distance ds, the control device 2 stops the robot 1. Herein, the stoppage distance ds is preferably greater than the warning distance da, as shown in FIG. 2.

In the present invention, the robot is stopped when the portable wireless operation panel 4 reaches the stoppage distance, without regard to the communication quality between the control device 2 and the portable wireless operation panel 4. Accordingly, the robot 1 is stopped to ensure safety when the portable wireless operation panel 4 moves away to such a distance that the movement of the robot cannot be seen from the point of the portable wireless operation panel 4. Further, since the warning generator 8 generates a warning, this can prevent the portable wireless operation panel 4 from reaching the stoppage distance to stop the robot 1 without knowledge of the operator, thus making it possible to assure convenience.

Second Embodiment

Figure 3:
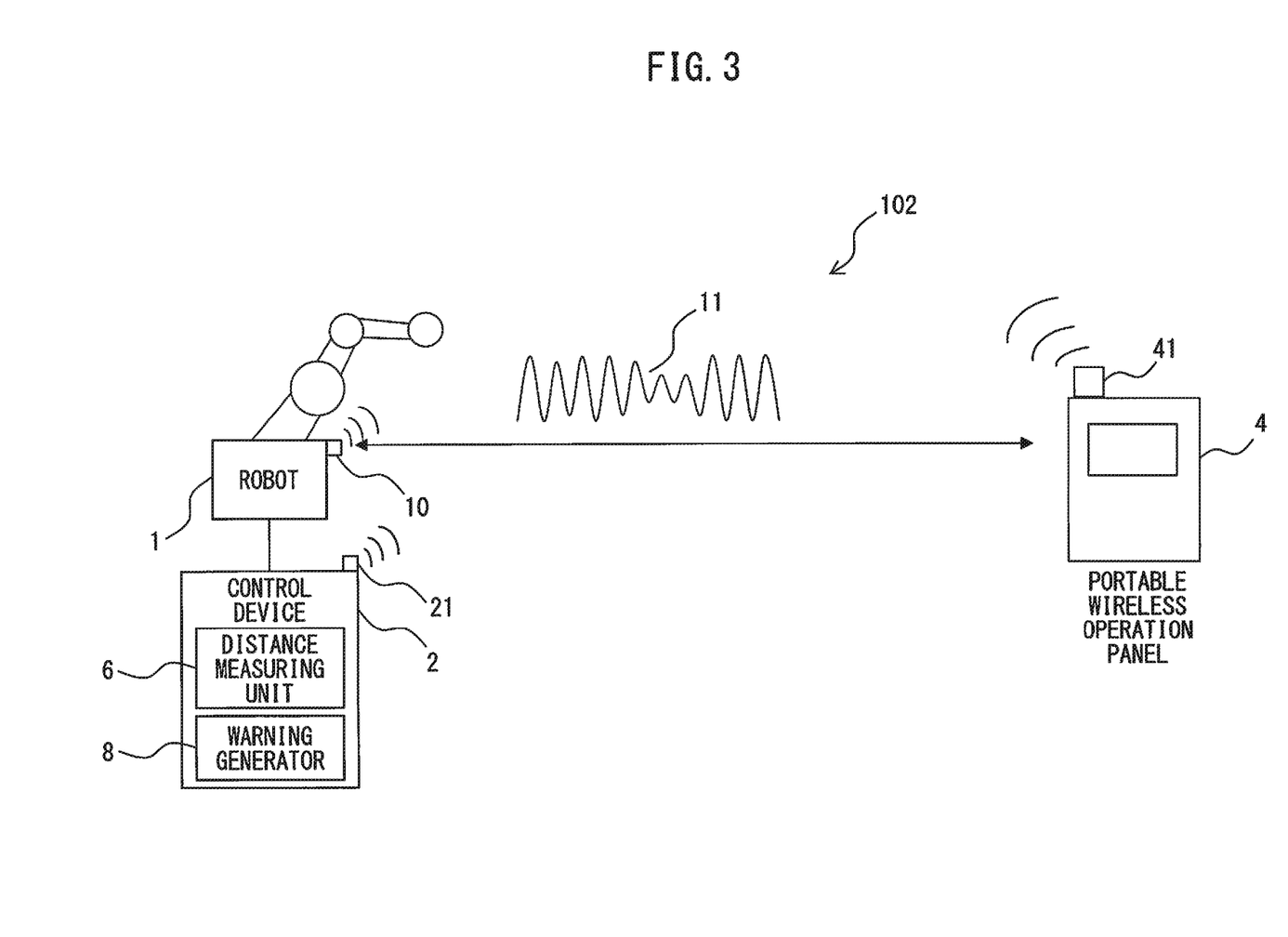
FIG. 3 is a configurational diagram showing a robot control system according to a second embodiment of the present invention.

A robot control system according to a second embodiment of the present invention will be described. FIG. 3 shows a configurational diagram of a robot control system according to the second embodiment of the present invention. The robot control system 102 according to the second embodiment is different from the robot control system 101 of the first embodiment in that a radio communication signal receiving device 10 that receives radio communication signals from the portable wireless operation panel 4 is provided for a machine, i.e., the robot 1 or in proximity to the robot 1 so as to measure the distance between the robot 1 and the portable wireless operation panel 4 based on the radio wave intensity of the radio communication signals between the radio communication signal receiving device 10 and the portable wireless operation panel 4. The other configurations according to the second embodiment are the same as those in the robot control system according to the first embodiment, so a detailed description is omitted.

As shown in FIG. 3, the robot 1 includes the radio communication signal receiving device 10, which exchanges radio communication signals 11 with the transceiver 41 of the portable wireless operation panel 4. The distance measuring unit 6 measures the distance between the robot 1 and the portable wireless operation panel 4, based on the radio wave intensity of radio communication signals 11. The warning generator 8, based on the measured distance, generates a warning to the operator or stops the robot 1 when the distance between the robot 1 and the portable wireless operation panel 4 exceeds a predetermined threshold.

Use of the radio wave intensity of the radio communication signals for distance measurement makes it possible to minimize the device configuration necessary for measuring distance (as much as an electric circuit for measuring radio wave intensity). Though, in the example shown in FIG. 3, the transceiver 41 is used as both the receiver for distance measurement and the receiver for radio communication, the receiver for distance measurement (for measuring radio wave intensity) and the receiver for radio communication may be totally separated.

Third Embodiment

Figure 4:
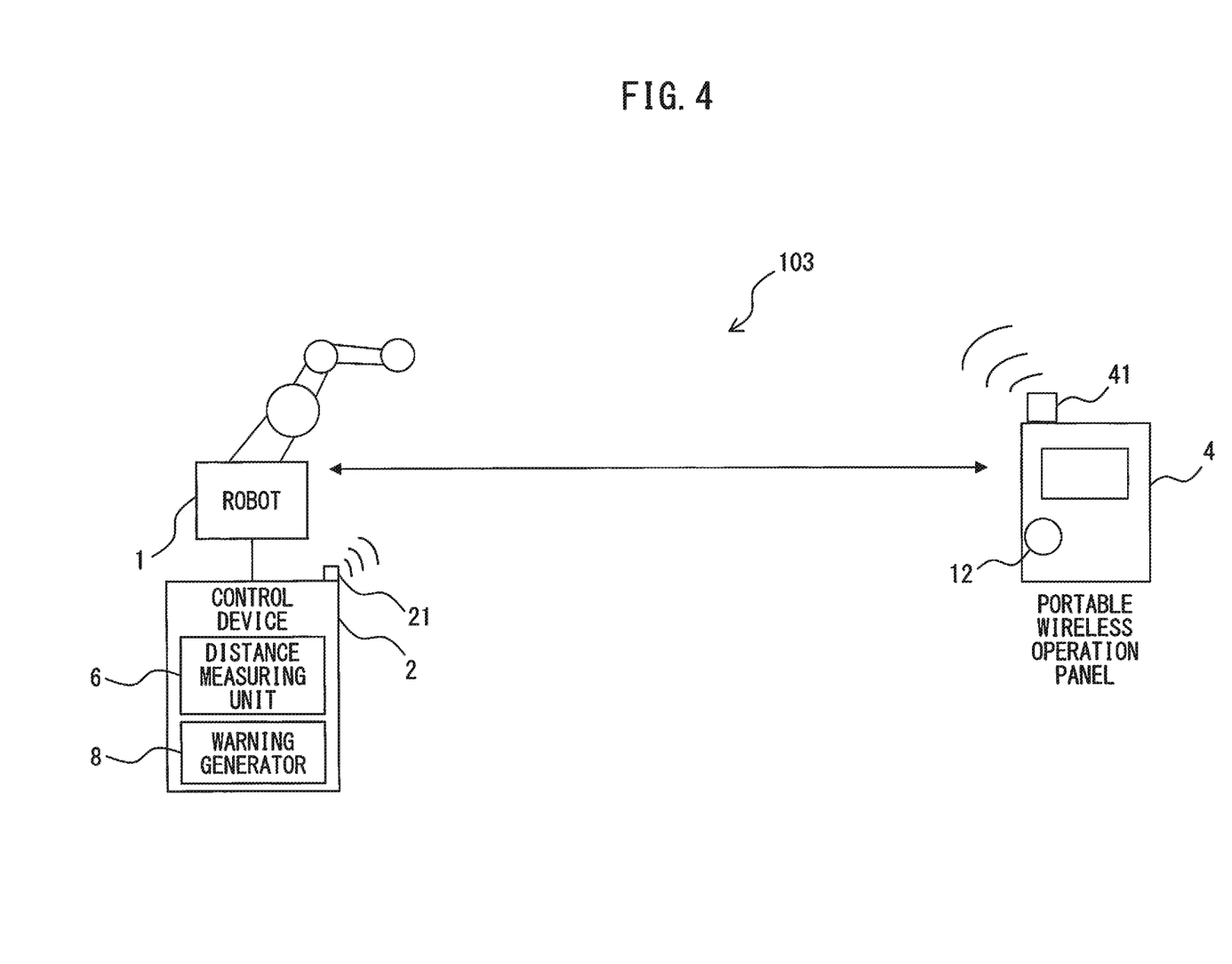
FIG. 4 is a configurational diagram showing a robot control system according to a third embodiment of the present invention.

A robot control system according to a third embodiment of the present invention will be described. FIG. 4 shows a configurational diagram of a robot control system according to the third embodiment of the present invention. The robot control system 103 according to the third embodiment is different from the robot control system 101 of the first embodiment in that the portable wireless operation panel 4 further includes an acceleration sensor 12 to measure the distance between a machine, i.e., the robot 1 and the portable wireless operation panel 4 based on the acceleration measured by the acceleration sensor 12. The other configurations according to the third embodiment are the same as those in the robot control system according to the first embodiment, so a detailed description is omitted.

As shown in FIG. 4, the portable wireless operation panel 4 is provided with the acceleration sensor 12. The distance measuring unit 6 measures the distance between the robot 1 and the portable wireless operation panel 4, based on the acceleration measured by the acceleration sensor 12. The warning generator 8, based on the measured distance, generates a warning to the operator or stops the robot 1 when the distance between the robot 1 and the portable wireless operation panel 4 exceeds a predetermined threshold.

It is possible to measure the relative position of the portable wireless operation panel 4 at present based on the position of the portable wireless operation panel 4 at a certain point of time by use of the acceleration sensor 12. Accordingly, if the relative position between the robot 1 and the portable wireless operation panel 4 at a certain point of time is known, the distance between the robot 1 and the portable wireless operation panel 4 at present can also be known.

Further, it is advantageous that the measured value by the acceleration sensor 12 is not affected by the surroundings unlike the radio wave intensity.

Though, in the example shown in FIG. 4, the acceleration sensor 12 is mounted on the portable wireless operation panel 4, it is not limited to this configuration. That is, the acceleration sensor may be mounted on a device that can communicate with the portable wireless operation panel 4 or the control device 2 and that can be carried by the operator so as to measure the distance between the machine, i.e., robot 1 and the portable wireless operation panel 4 based on the acceleration measured by the acceleration sensor. Accordingly, in this case, the acceleration sensor may be an external device or may be provided as another device (such as a smartphone) capable of performing communication.

It should be noted that if this system is left alone for a long time, the measured position may dissociate from the actual position, and therefore it is preferable that an auxiliary measurement is also performed when operating for a long time.

Figure 5:
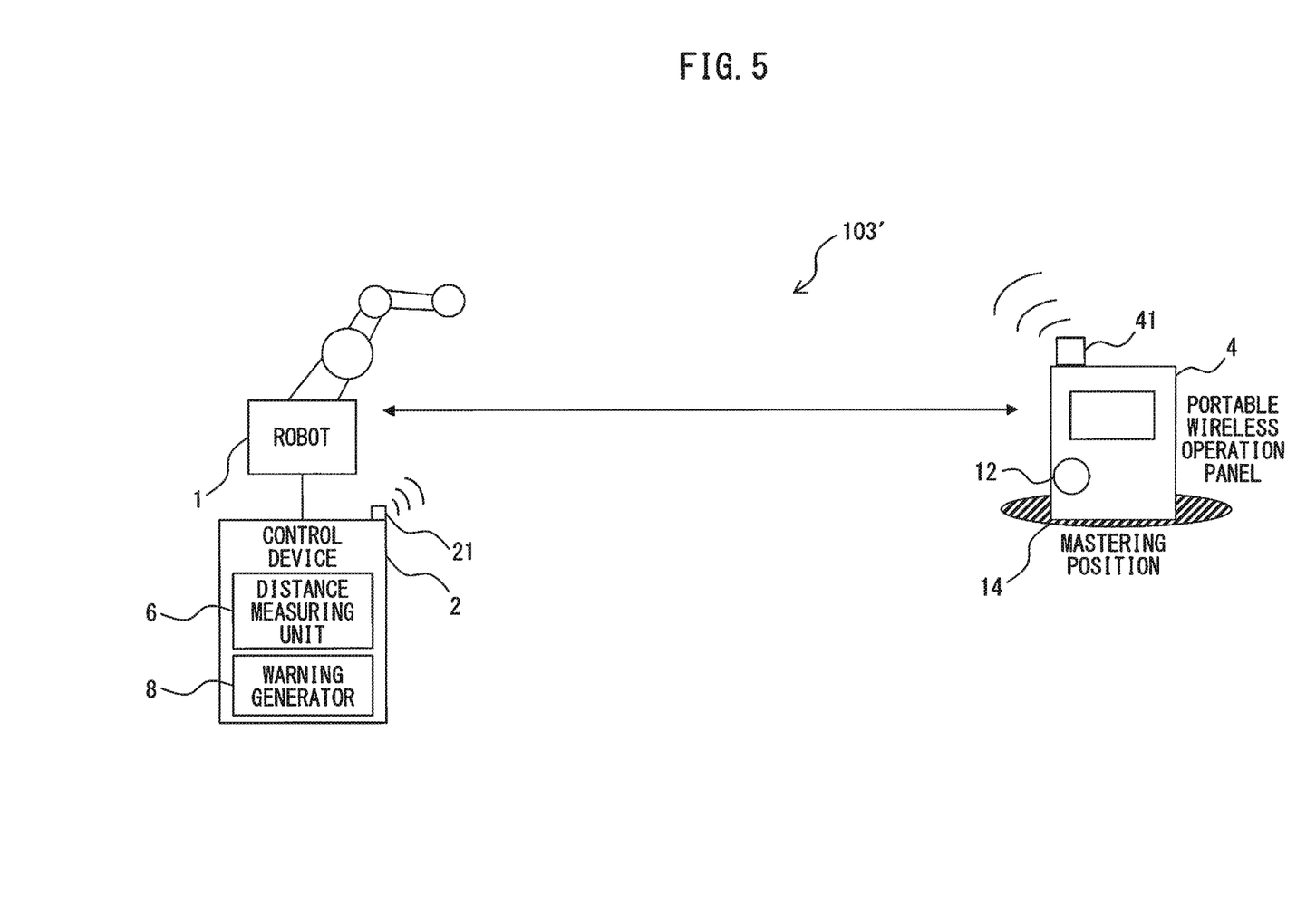
FIG. 5 is a configurational diagram showing a robot control system according to a modified example of the third embodiment of the present invention.

Further, as in a robot control system 103' as a modified example of the third embodiment shown in FIG. 5, a position mastering site (mastering position) 14 of the portable wireless operation panel 4, from which the distance to a machine, i.e., the robot 1 has been previously measured, may be defined.

The relative position between the mastering position 14 and the robot 1 is measured beforehand, and the portable wireless operation panel 4 is made to recognize (is instructed by the operator or made to automatically recognize) that it resides at the mastering position 14. In this way, the portable wireless operation panel 4 records the distance between the robot 1 and the portable wireless operation panel 4 at the point of time at the mastering position 14. Since checking the measured value by the acceleration sensor makes it possible to know how long the portable wireless operation panel 4 has moved from the mastering position 14, it is possible to know the distance between the robot 1 and the portable wireless operation panel 4.

Fourth Embodiment

Figure 6:
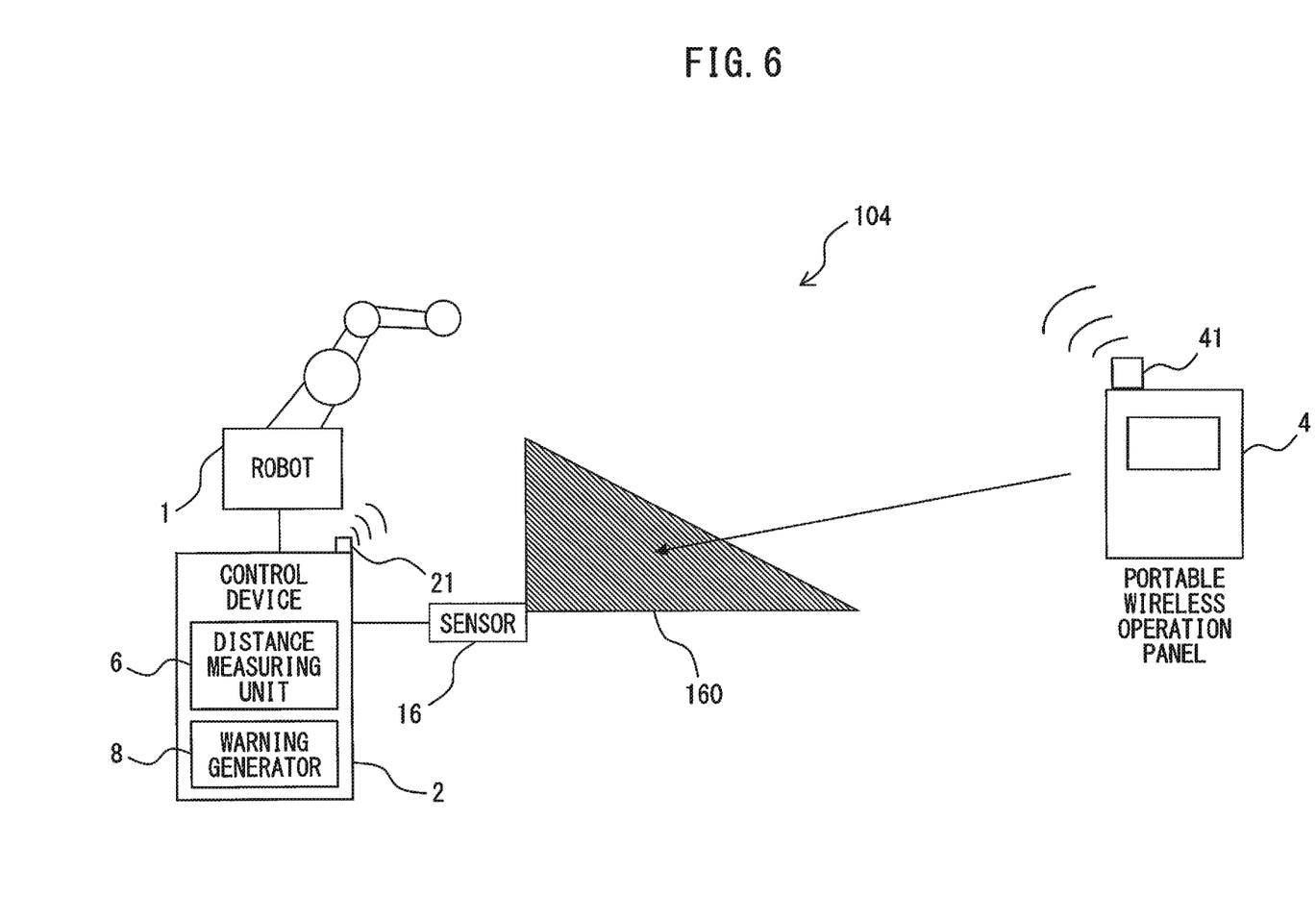
FIG. 6 is a configurational diagram showing a robot control system according to a fourth embodiment of the present invention.

A robot control system according to a fourth embodiment of the present invention will be described. FIG. 6 shows a configurational diagram of a robot control system according to the fourth embodiment of the present invention. The robot control system 104 according to the fourth embodiment is different from the robot control system 101 of the first embodiment in that the distance between a machine, i.e., the robot 1 and the portable wireless operation panel 4 is measured by a sensor 16 arranged around the robot 1 including, at least, one of a laser sensor, a pressure sensor, an infrared sensor and a light curtain. The other configurations according to the fourth embodiment are the same as those in the robot control system according to the first embodiment, so a detailed description is omitted.

Provision of the sensor 16 (a laser sensor, pressure sensor, infrared sensor, light curtain and/or the like) around the robot 1 makes it possible to know the approach of the operator to the robot 1 when the portable wireless operation panel 4 enters a sensing range 160 of the sensor 16 as indicated by an arrow in FIG. 6.

Since it is not possible to know whether or not the operator is carrying the subject portable wireless operation panel 4 for controlling the robot by the sensor 16 alone, it is preferable to use another means at the same time. For example, when aftermentioned RFID (Radio Frequency Identifier) tags are applied to portable wireless operation panels 4 and the RFID tags are recorded with serial numbers of portable wireless operation panels 4, it is possible to identify which portable wireless operation panel 4 has passed through the sensor for detection of RFID tags when it passes. When the portable wireless operation panel 4 that controls the robot can be identified, the distance measuring unit 6 measures the distance between the robot 1 and the portable wireless operation panel 4, and the warning generator 8 can give a warning or stop the robot 1 based on the measured distance.

Figure 7:
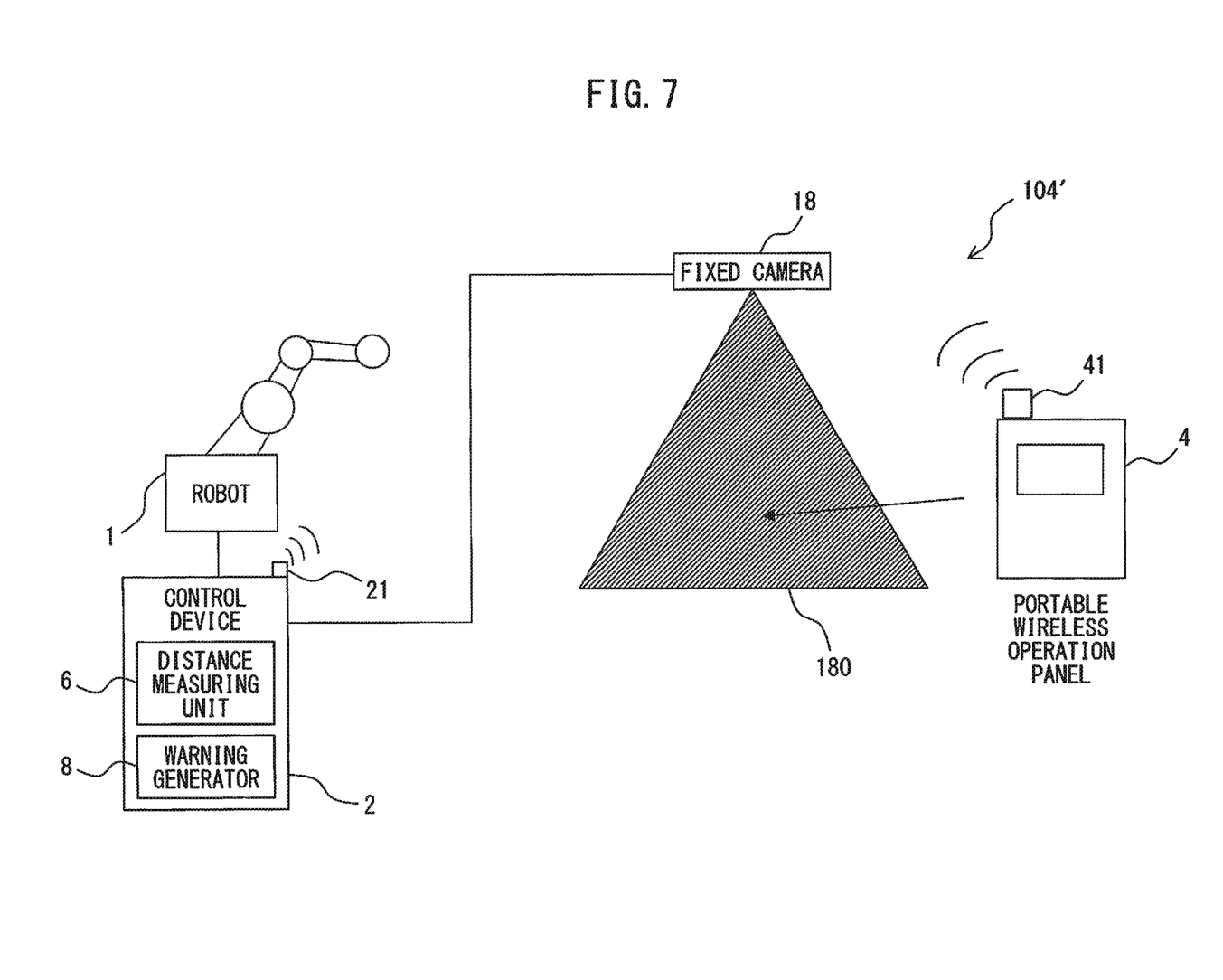
FIG. 7 is a configurational diagram showing a robot control system according to a modified example of the fourth embodiment of the present invention.

Instead of the sensor, a fixed camera 18 for taking the image of the surroundings of a machine, i.e., robot 1 may be arranged as in robot control system 104' as a modified example of the fourth embodiment shown in FIG. 7, and therefore the distance between the robot 1 and the portable wireless operation panel 4 can be measured by analyzing the image taken by the fixed camera 18.

When the fixed camera 18 capable of detecting an entry of an object to the surroundings of the robot 1 is installed, and if the portable wireless operation panel 4 enters within the imaging area 180 of the fixed camera 18 as indicated by the arrow in FIG. 7, it is possible by image recognition to know at which position the operator carrying the portable wireless operation panel 4 exists relative to the robot 1.

Since it is not possible to know whether or not the operator is carrying the portable wireless operation panel 4 for controlling the robot by the fixed camera 18 alone, it is preferable to use another means concurrently similarly to the case of the sensor. For example, when RFID tags are applied to the portable wireless operation panel 4 and the RFID tags are recorded with serial numbers of portable wireless operation panels 4, it is possible to identify which portable wireless operation panel 4 has passed through the sensor for detecting RFID tags when it passes. When the portable wireless operation panel 4 that controls the subject robot can be identified, the distance measuring unit 6 measures the distance between the robot 1 and the portable wireless operation panel 4, and the warning generator 8 can generate a warning or stop the robot 1 based on the measured distance.

Fifth Embodiment

Figure 8:
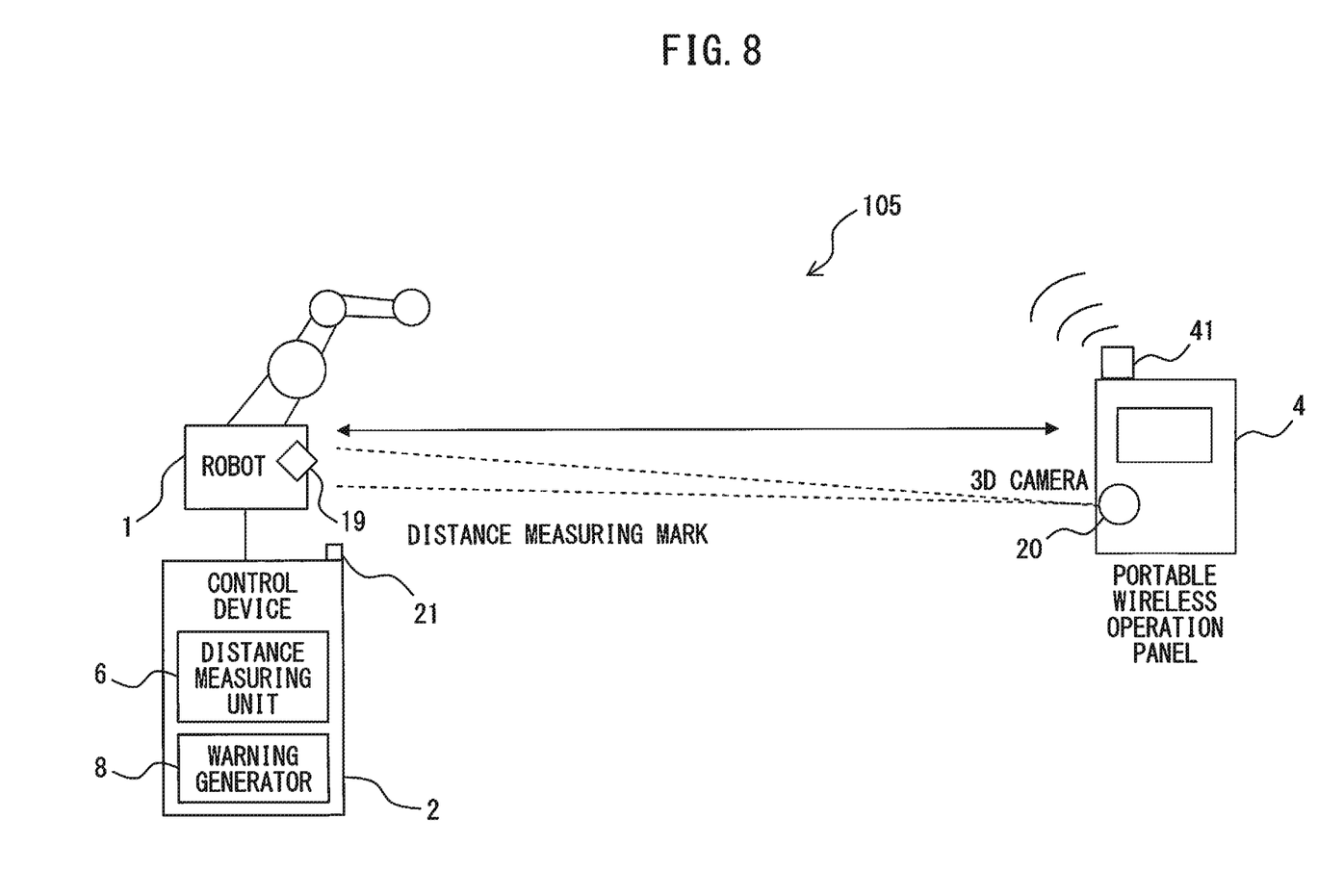
FIG. 8 is a configurational diagram showing a robot control system according to a fifth embodiment of the present invention.

A robot control system according to the fifth embodiment of the present invention will be described. FIG. 8 shows a configurational diagram of a robot control system according to the fifth embodiment of the present invention. The robot control system 105 according to the fifth embodiment is different from the robot control system 101 of the first embodiment in that a three-dimensional (3D) camera 20 that can take an image of the portable wireless operation panel 4 or a machine, i.e., the robot 1 or both, and the distance between the robot 1 and the portable wireless operation panel 4 is measured based on the measured distance by the 3D camera 20 between the 3D camera 20 and, the portable wireless operation panel 4, and/or the robot 1. The other configurations according to the fifth embodiment are the same as those in the robot control system according to the first embodiment, so a detailed description is omitted.

As shown in FIG. 8, provision of the 3D camera 20 in the portable wireless operation panel 4 to take an image of the robot 1 enables measurement of the distance between the robot 1 and the portable wireless operation panel 4. In this case, a distance measuring mark 19 may be put on the robot 1 as a marking for measuring the distance by the 3D camera 20. On the other hand, when the 3D camera 20 is mounted on the robot 1, it is possible to measure the distance between the robot 1 and the portable wireless operation panel 4 by taking the image of the portable wireless operation panel 4 using the 3D camera 20. Further, when the 3D camera 20 is arranged at a position from which both the robot 1 and the portable wireless operation panel 4 can be taken, it is possible to measure the distance between the robot 1 and the portable wireless operation panel 4 by taking an image of both.

When the distance between the portable wireless operation panel 4 and the robot 1 is measured by the 3D camera 20, the distance at that point of time may be related with the radio wave intensity at the point of time. Even if the portable wireless operation panel 4 has moved from the point where the 3D camera 20 measured the distance, continuous monitoring of the radio wave intensity can provide information on the current distance.

As a method of using the radio wave intensity and the 3D camera in combination, the distance measured between the portable wireless operation panel 4 and the robot 1 at a certain point by the 3D camera can be associated with the radio wave intensity at that point, whereby the distance and the radio wave intensity can be associated at the circumstance right before performing communication. As a result, it is possible to reduce the influence of differences resulting from the date of operation and surrounding equipment.

The 3D camera may be deployed at a place apart and adapted to use triangulation. The camera may be fixed on a wall or may be movable (to swing or along with a moving direction).

Further, the 3D camera may be mounted on a device that can communicate with the portable wireless operation panel 4 or the control device 2 and that can be carried by the operator so as to take an image of a machine, i.e., the robot 1 and thereby measure the distance between the robot 1 and the portable wireless operation panel 4. In this way, the 3D camera may be externally attached or may employ another device (such as a smartphone) that can perform wireless communication.

Sixth Embodiment

Figure 9:
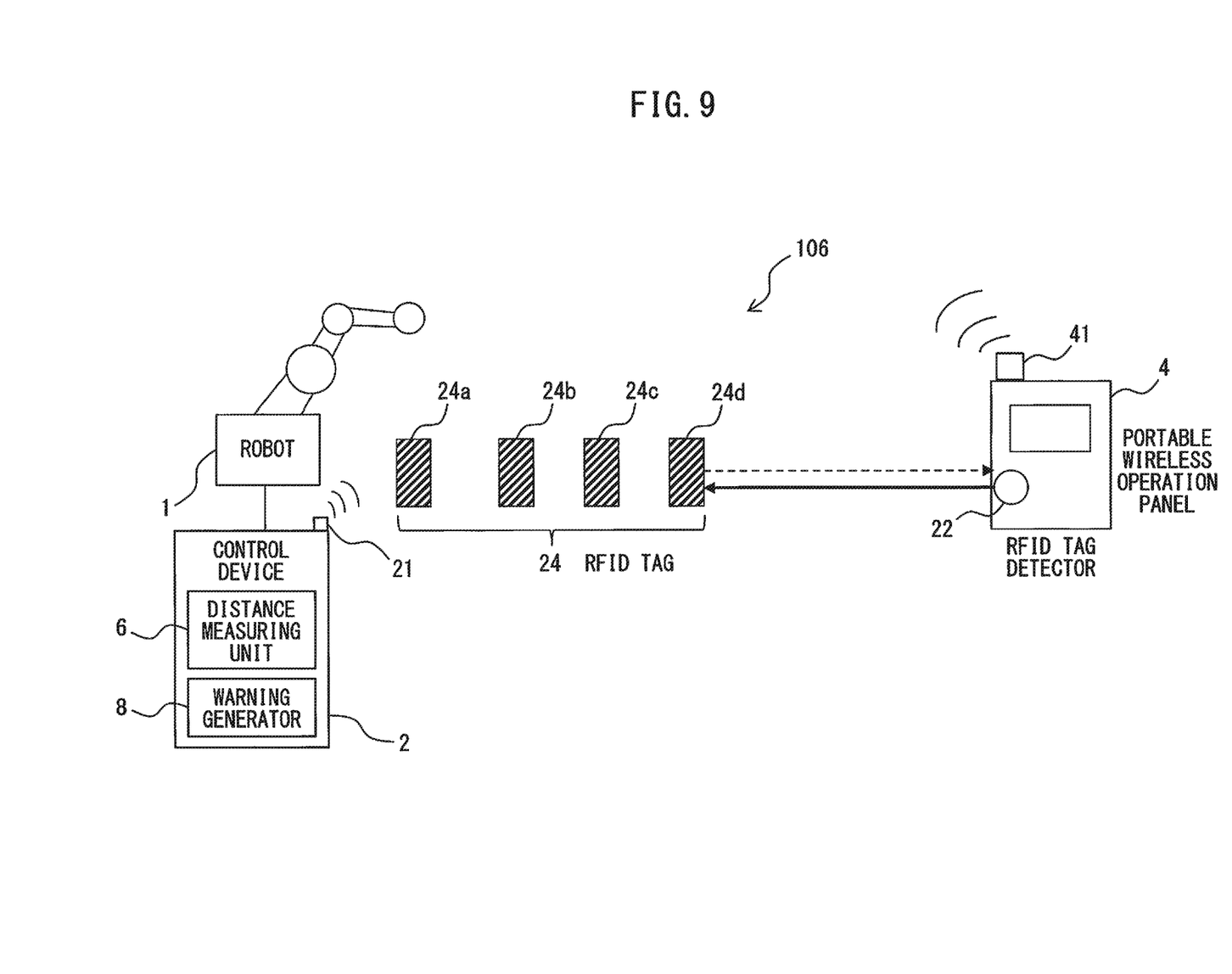
FIG. 9 is a configurational diagram showing a robot control system according to a sixth embodiment of the present invention.

A robot control system according to the sixth embodiment of the present invention will be described. FIG. 9 shows a configurational diagram of a robot control system according to the sixth embodiment of the present invention. The robot control system 106 according to the sixth embodiment is different from the robot control system 101 of the first embodiment in that the portable wireless operation panel 4 includes an RFID tag detector 22 while an RFID tag 24 that stores positional information is arranged around a machine, i.e., the robot 1 so as to measure the distance between the robot 1 and the portable wireless operation panel 4 by use of the positional information stored in the RFID tag 24 that is read out by the RFID tag detector 22. The other configurations according to the sixth embodiment are the same as those in the robot control system according to the first embodiment, so a detailed description is omitted.

Since the RFID tag 24 is recorded with information on its position from the robot 1, when the portable wireless operation panel 4 enters the RFID detecting area, the RFID tag detector 22 reads the position from the tag and hence acquires the information on the distance between the robot 1 and the portable wireless operation panel 4.

In some schemes, it is possible to know the distance to the RFID tag 24 based on the time lag between the RFID tag detecting signal and the return signal from the RFID tag 24, hence obtain the current position in further detail.

In a robot having a wide operation range, multiple RFID tags (e.g., 24*a* to 24*d*) are preferably used. The example shown in FIG. 9 includes four RFID tags, but the invention should not be limited to this configuration. But it is still possible for a robot that is operated in a limited range to ensure safety by providing only one RFID tag.

Seventh Embodiment

Figure 10:
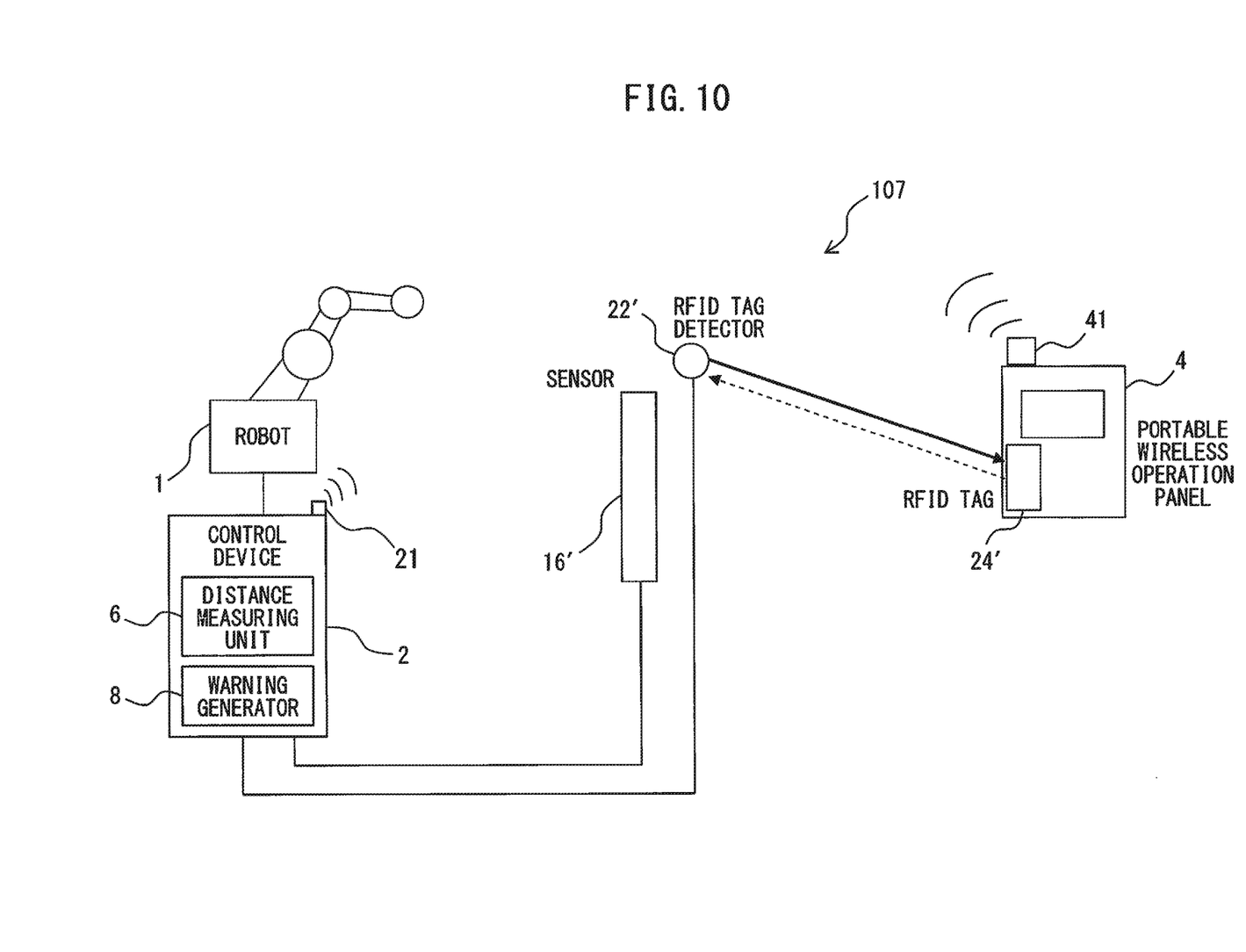
FIG. 10 is a configurational diagram showing a robot control system according to a seventh embodiment of the present invention.

A robot control system according to a seventh embodiment of the present invention will be described. FIG. 10 shows a configurational diagram of a robot control system according to the seventh embodiment of the present invention. The robot control system 107 according to the seventh embodiment is different from the robot control system 101 of the first embodiment in that the system further includes an RFID tag detector 22' arranged near a sensor 16' arranged around a machine, i.e., the robot 1 selected from at least one of a laser sensor, a pressure sensor, an infrared sensor and a light curtain and an RFID tag 24' provided for the portable wireless operation panel 4, and that the distance between the robot 1 and the portable wireless operation panel 4 is measured based on the detected status of the RFID tag 24' before and after detection of an object by the sensor 16'. The other configurations according to the seventh embodiment are the same as those in the robot control system according to the first embodiment, so a detailed description is omitted.

When the RFID detector 22' is arranged near the robot 1, approach of the portable wireless operation panel 4 to the robot 1 can be known. It is not possible to determine whether the approaching object is the operator carrying the portable wireless operation panel 4 or a mere obstacle by the sensor 16' such as an infrared sensor and the like. Provision of the RFID detector 22' near the sensor 16' makes it possible to distinguish whether or not the operator carrying the portable wireless operation panel 4 has passed by, by monitoring the detection timing of the sensor in combination.

As specific examples of detection, the following cases can be considered:

(1) When the sensor perceives an object and at the same time the short-range RFID detecting device arranged near the sensor detects the portable wireless operation panel, passage of the portable wireless operation panel therethrough can be known. Thereafter, how or in which direction the portable wireless operation panel 4 has passed is determined by use of another means (a beacon or radio wave intensity) to determine the distance.

(2) An RFID tag detecting device that can recognize the distance to an RFID tag by measuring the time for return transmission may be used. For example, the RFID tag detecting device is deployed at a position closer to the robot than the sensor is, in order to enable detection of the portable wireless operation panel residing at the sensor position. In this arrangement, when the RFID tag passes by the sensor while approaching the detecting device, the operation panel is determined to approach the robot, whereas when the RFID tag passes by the sensor while receding from the detecting device, the operation panel is determined to move away from the robot.

Figure 11:
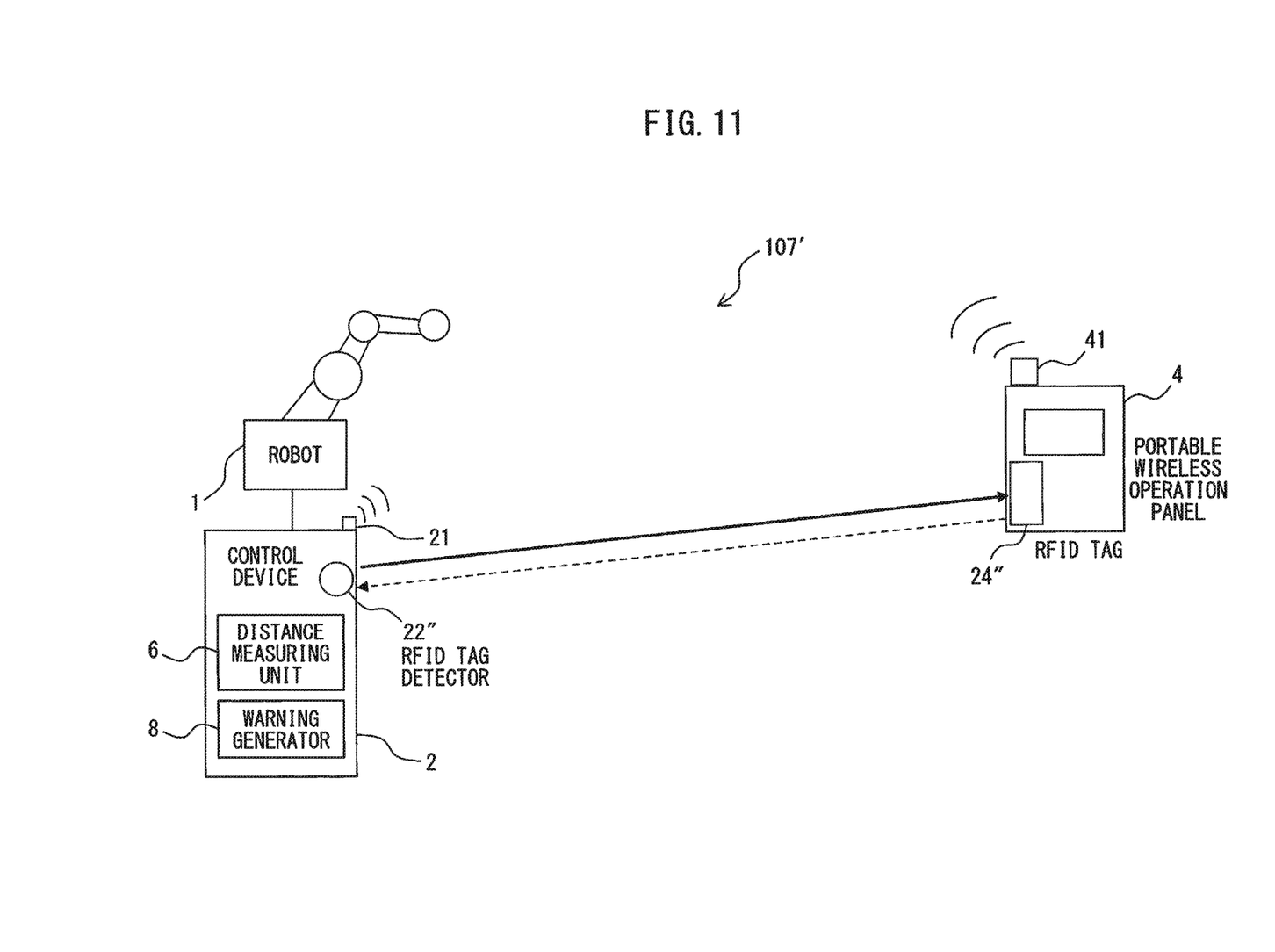
FIG. 11 is a configurational diagram showing a robot control system according to a modified example of the seventh embodiment of the present invention; and, FIG. 12 is a configurational diagram showing a robot control system according to an eighth embodiment of the present invention.

Further, as in a robot control system 107' which is a modified example of the seventh embodiment shown in FIG. 11, the means for measuring the distance may be implemented by an RFID tag 24" held by the portable wireless operation panel 4. In this case, an RFID detector 22" is arranged with or near the robot 1 while the RFID tag 24" is arranged with the portable wireless operation panel 4. That is, the RFID detector 22" arranged with or near a machine, i.e., the robot 1 and the RFID tag 24" arranged with the portable wireless operation panel 4 are further provided so as to measure the distance between the robot 1 and the portable wireless operation panel 4 based on the detected status of the RFID tag 24".

Eighth Embodiment

Figure 12:
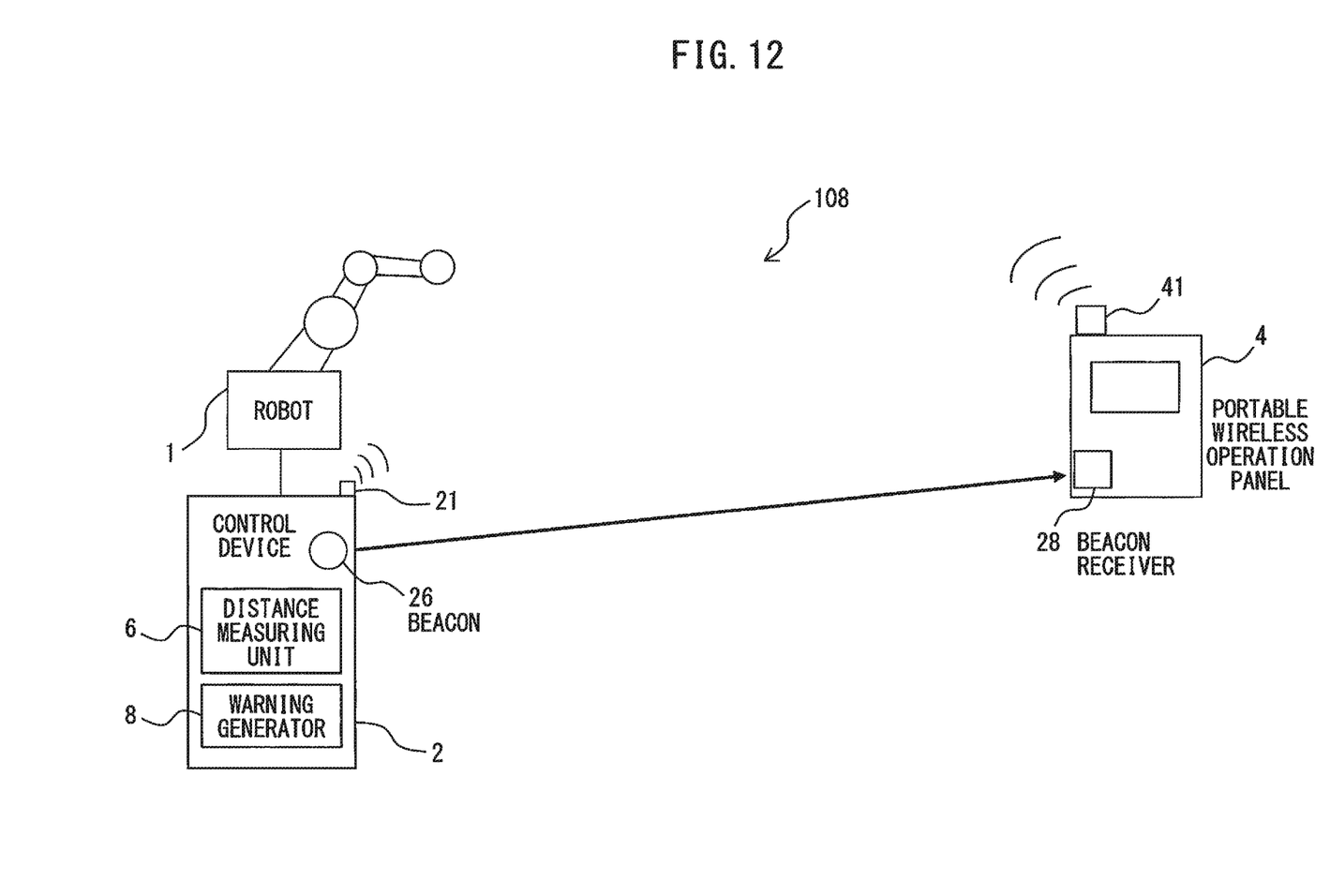

A robot control system according to the eighth embodiment of the present invention will be described. FIG. 12 shows a configurational diagram of a robot control system according to the eighth embodiment of the present invention. The robot control system 108 according to the eighth embodiment is different from the robot control system 101 of the first embodiment in that a beacon 26 arranged with or near a machine, i.e., the robot 1 and a beacon receiver 28 for the beacon as a receiving device arranged with the portable wireless operation panel 4 are further provided to measure the distance between the robot 1 and the portable wireless operation panel 4 by the beacon 26. The other configurations according to the eighth embodiment are the same as those in the robot control system according to the first embodiment, so a detailed description is omitted.

Provision of the beacon 26 near the robot 1 and provision of the beacon receiver 28 in the portable wireless operation panel 4 enables recognition of the distance between the robot 1 and the portable wireless operation panel 4 as long as the portable wireless operation panel 4 is residing within the range in which radio waves from the beacon 26 reach.

Though, in the example shown in FIG. 12, the beacon receiver 28 is arranged with the portable wireless operation panel 4, the invention should not be limited to this configuration. The beacon receiver 28 may be an external device or may be provided as another device (such as a smartphone) capable of communication.

Further, the distance between a machine, i.e., the robot 1 and the portable wireless operation panel 4 may be measured by GPS (Global Positioning System).

The above-described means (an acceleration sensor, a radio wave intensity detector, a camera, an RFID tag, a beacon, GPS and others) for detecting the distance between the robot 1 and the portable wireless operation panel 4 can be used in combination in various ways so as to improve the accuracy of distance measurement. It is preferable that appropriate combinations are selected taking into account the scale of the robot control system, the introduction cost, etc.

For example, the position can be measured either by an acceleration sensor or based on radio wave intensity. The acceleration sensor is not useful for small movements which cannot be detected, hence has a weakness that the estimation will greatly deviate from the actual position after the passage of time, but is good at dealing with sharp movement. The intensity of radio waves is affected by external disturbances but the long-term average of radio wave intensity depends on the position. These can be made use of to complement each other to determine the exact distance.

According to the robot control systems of the embodiments of the present invention, it is possible to provide a robot control system capable of improving safety by measuring the distance between the robot and the portable wireless operation panel, warning the operator when the distance has become far and stopping the robot when the distance has become even further.

The invention claimed is:

1. A robot control system, comprising:
a control device configured to control a machine;
a portable wireless operation panel configured to perform wireless communication with the control device to control the machine;
a distance measuring unit configured to measure a distance between the machine and the portable wireless operation panel;
a warning generator-configured to emit a warning to an operator or stop the machine in response to the distance between the machine and the portable wireless operation panel exceeding a predetermined threshold value; and
a three-dimensional camera configured to take an image of the portable wireless operation panel or the machine or both,
wherein the distance measuring unit is configured to use the distance measured by the three-dimensional camera between the three-dimensional camera and, the portable wireless operation panel, and/or the machine to measure the distance between the machine and the portable wireless operation panel, and
wherein the three-dimensional camera is provided for the portable wireless operation panel to take an image of the machine and thereby measure the distance between the machine and the portable wireless operation panel.

2. A robot control system, comprising:
a control device configured to control a machine;
a portable wireless operation panel configured to perform-wireless communication with the control device to control the machine;
a distance measuring unit configured to measure a-distance between the machine and the portable wireless operation panel;
a warning generator configured to emit a warning to an operator or stop the machine in response to the distance between the machine and the portable wireless operation panel exceeding a predetermined threshold value; and a three-dimensional camera configured to take an image of the portable wireless operation panel or the machine or both, wherein the distance measuring unit is configured to use the distance measured by the three-dimensional camera between the three-dimensional camera and, the portable wireless operation panel, and/or the machine to measure the distance between the machine and the portable wireless operation panel, and wherein the three-dimensional camera is mounted on a device communicable with the portable wireless operation panel or the control device, and the device is carriable by the operator so as to take an image of the machine and thereby measure the distance between the machine and the portable wireless operation panel.

* * * * *